Dec. 18, 1956  R. A. ROBERT  2,774,556
AIRCRAFT WITH VARIABLE WING ARRANGEMENT
Filed June 13, 1951  10 Sheets-Sheet 1
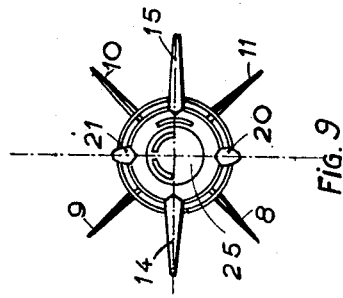
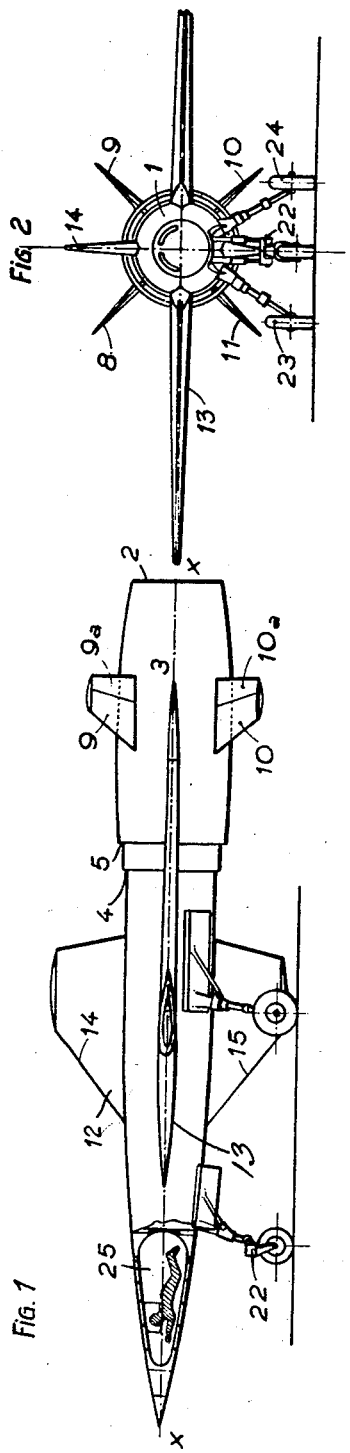
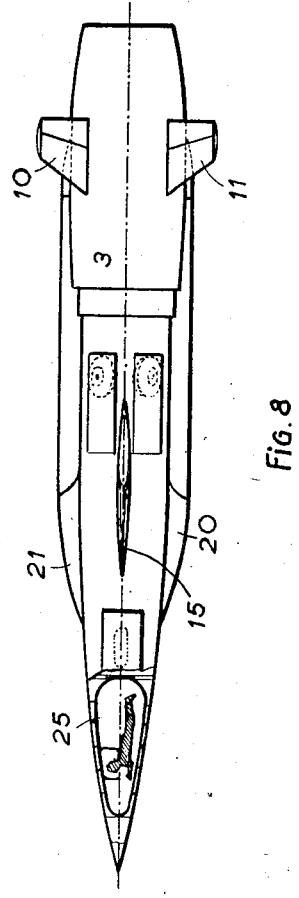
INVENTOR
ROGER AIME ROBERT
By: Haseltine, Lake & Co.
AGENTS Dec. 18, 1956 R. A. ROBERT 2,774,556
AIRCRAFT WITH VARIABLE WING ARRANGEMENT
Filed June 13, 1951 10 Sheets-Sheet 2
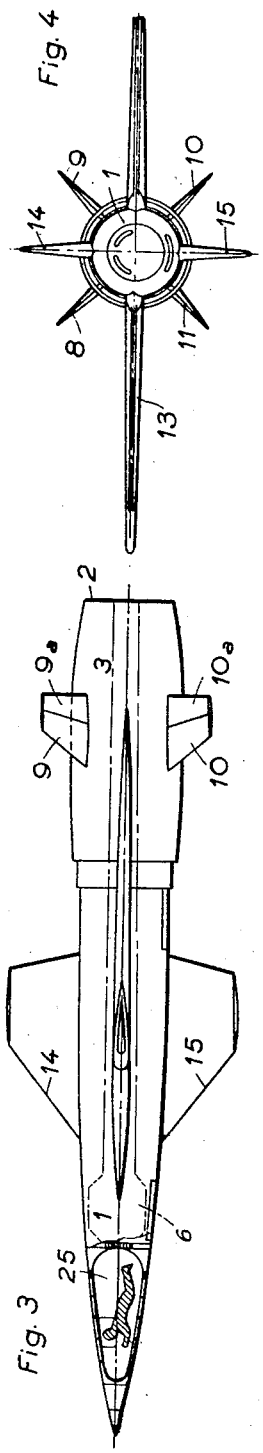
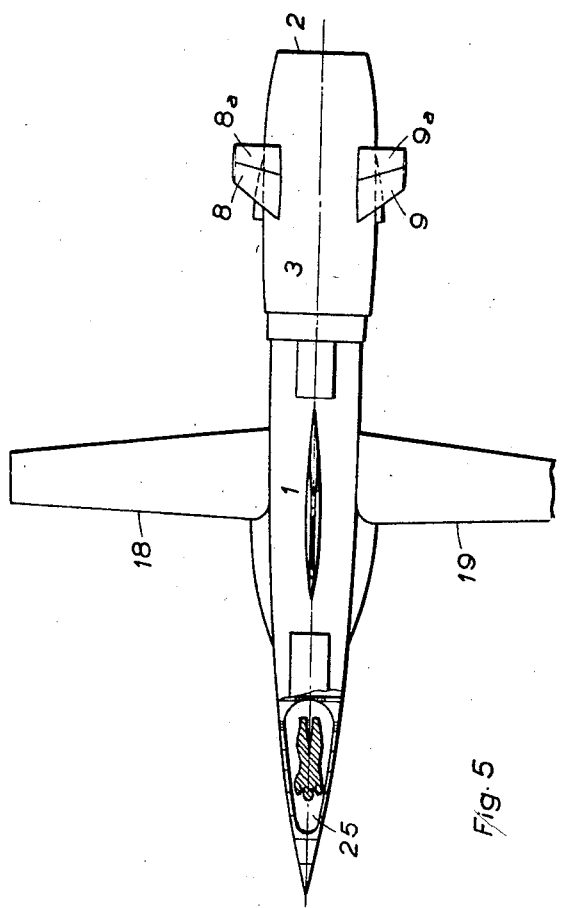
INVENTOR
ROGER AIME ROBERT
By: Haseltine, Lake & Co.
AGENTS Dec. 18, 1956  R. A. ROBERT  2,774,556
AIRCRAFT WITH VARIABLE WING ARRANGEMENT
Filed June 13, 1951  10 Sheets-Sheet 3
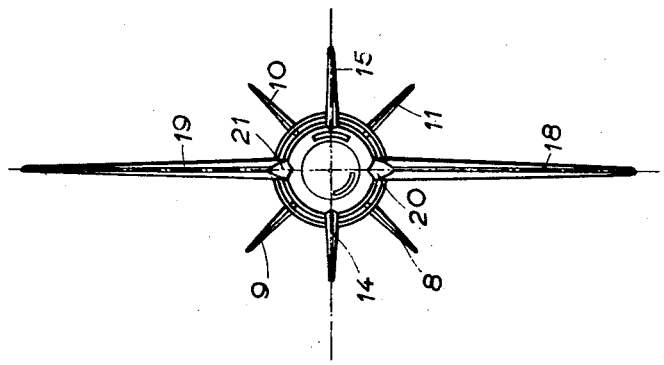
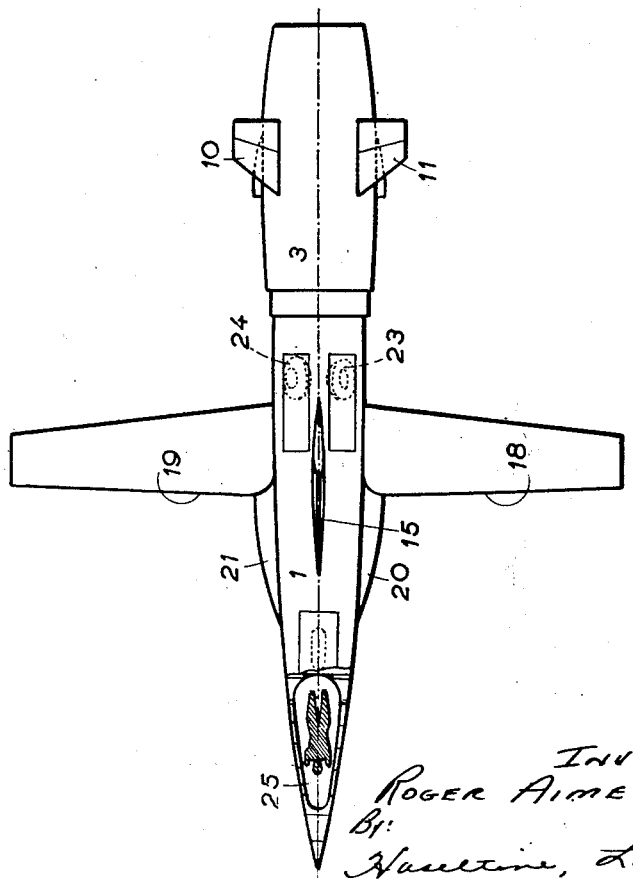

Dec. 18, 1956     R. A. ROBERT     2,774,556
AIRCRAFT WITH VARIABLE WING ARRANGEMENT
Filed June 13, 1951     10 Sheets-Sheet 4
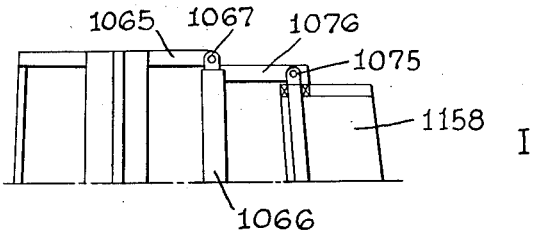
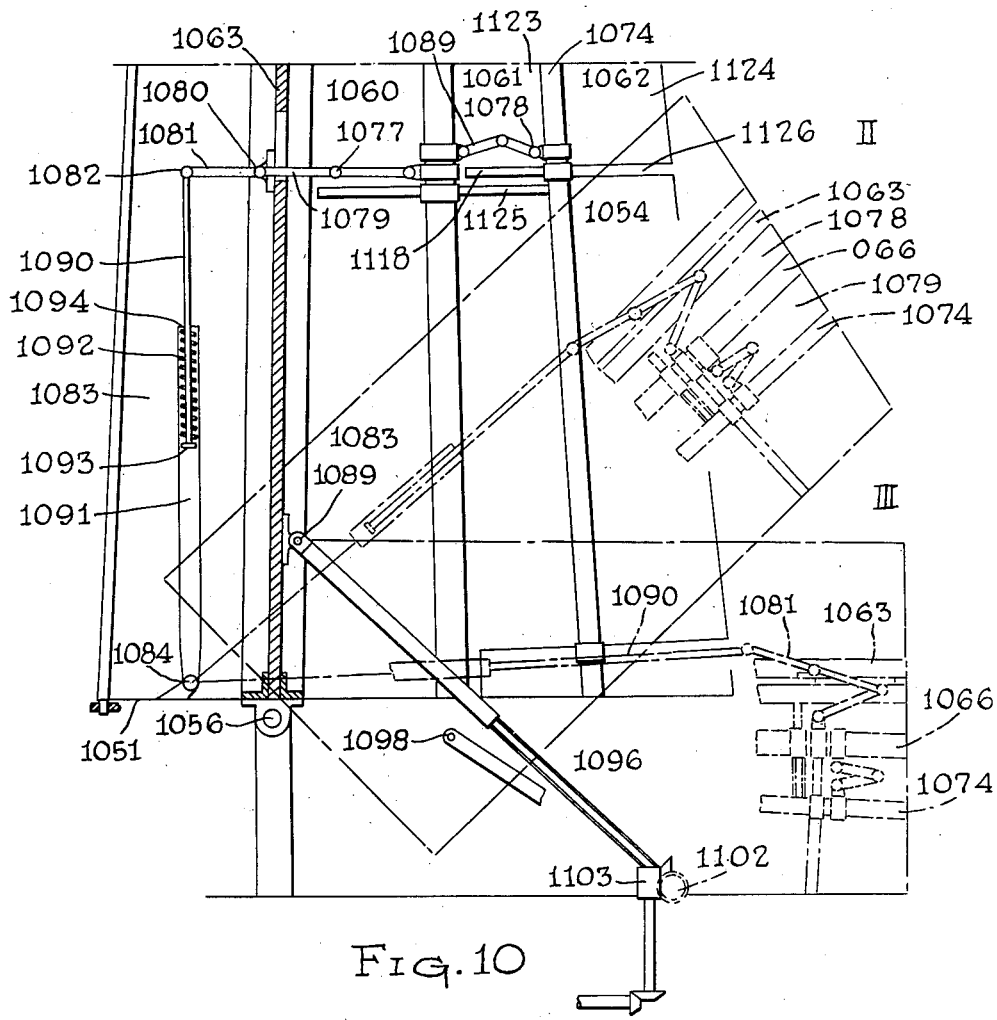
Fig. 10
INVENTOR
ROGER AIME ROBERT
By: Waters Roditi & Schantz
AGENTS Dec. 18, 1956 R. A. ROBERT 2,774,556
AIRCRAFT WITH VARIABLE WING ARRANGEMENT
Filed June 13, 1951 10 Sheets-Sheet 5

Dec. 18, 1956 R. A. ROBERT 2,774,556
AIRCRAFT WITH VARIABLE WING ARRANGEMENT
Filed June 13, 1951 10 Sheets-Sheet 7

INVENTOR
ROGER AIME ROBERT
BY
Naultin, Lake & C.
AGENTS

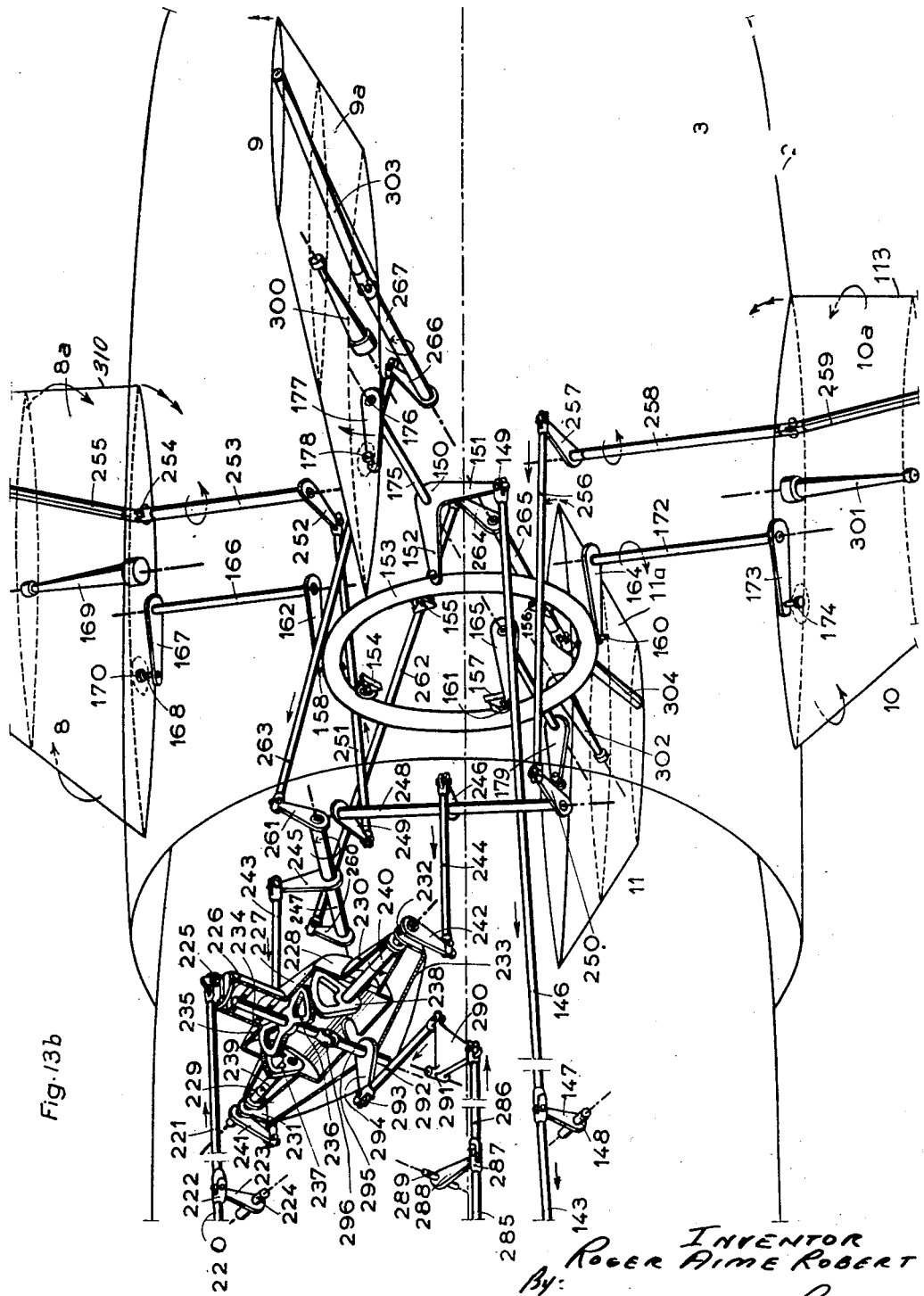

Dec. 18, 1956   R. A. ROBERT   2,774,556
AIRCRAFT WITH VARIABLE WING ARRANGEMENT
Filed June 13, 1951   10 Sheets-Sheet 9

INVENTOR
ROGER AIMÉ ROBERT
BY
Hauttine, Lake & Co.
AGENTS

United States Patent Office 2,774,556
Patented Dec. 18, 1956

2,774,556
AIRCRAFT WITH VARIABLE WING ARRANGEMENT

Roger A. Robert, Boulogne-sur-Seine, France

Application June 13, 1951, Serial No. 231,300

Claims priority, application France April 13, 1946

8 Claims. (Cl. 244—46)

This application is a continuation-in-part of my prior U. S. application Ser. No. 740,611, filed April 10, 1947, for "Aircraft," now abandoned.

The present invention relates to an aircraft adapted for high speed flight which at the same time is capable of being flown at lower speeds, whereby it can take off and land with as much facility as a conventional aircraft adapted to fly only at low speeds.

The development of high speed aircraft, and especially aircraft adapted for flight at supersonic speed, has heretofore been retarded by the limitations imposed on the design and construction thereof in order that the craft may be made to take off and land with adequate safety and on existing landing areas. The problem has in fact been an outstanding one for many years, and while various solutions differing widely in character have been put forward by designers, not one of the many solutions proposed has been found practically successful.

Thus, it was for a good many years attempted to design an airplane having a variable supporting area, so that it might be increased preparatory to taking off and landing, for providing the necessary support for the airplane. However aircraft designed on these lines were found to be highly complicated and expensive in construction, and not fully reliable in operation.

Known types of airplanes capable of flight at supersonic speeds in all cases represent no more than a compromise, which have also to fulfil conditions of reliability at high speeds, and landing and taking off always remain delicate operations therewith.

This problem has become even more difficult with the attainment of sonic and supersonic flying speeds, as the conditions then to be fulfilled not only relate to the area of the supporting surfaces, but also to their contour, and more particularly the shape of their aerofoil configuration. In this connection, it is a now well recognized fact that an airplane which is to approach or exceed the sonic barrier, must be provided with an extremely thin, razor-blade type, wing, in contradistinction to the conventional wings as designed for lower velocities.

It is an object of the invention to provide an airplane adapted equally well for flight at high speeds, i. e. subsonic, sonic and supersonic speeds, and at moderate or low flying speeds.

Another object is to provide an airplane which, while being capable of flying at very high speeds, will yet be able to take off and land as easily as an airplane the maximum speed of which is substantially lower than the velocity of sound.

It is a further object to provide an airplane so designed and constructed as to possess, inherently and simultaneously, the best possible characteristics both for sonic speeds and for much lower speeds.

A further object is to provide an airplane in which the supporting surface structure is adapted both for flight at sonic velocities and at moderate or low speeds.

A yet further object is to provide an airplane in which the supporting surface exhibits its maximum strength at velocities in the sonic range.

A still further object is to provide an airplane simple in construction, lightweight and economical, especially as compared to airplane designs of the variable supporting surface type as heretofore proposed.

Yet another object is to provide an airplane which is easy, reliable and safe to fly, both at low and moderate speeds and at speeds within the range of the velocity of sound.

Further objects of the invention will appear as the description proceeds.

In attaining the objects of the invention, I provide an airplane with two supporting surfaces, one adapted for low speed flight, and especially for taking off and landing, and the other adapted for high speed flight, especially at subsonic, sonic and supersonic velocities, and means for selectively making operative one, and inoperative the other, of said supporting surfaces.

That supporting surface which is provided for low speed flight consists of a wing of conventional aerofoil contour, whereas the supporting surface for high speed flight is provided with the thin or laminar aerofoil contour which has been recognized as desirable for crossing the sonic barrier.

In an airplane according to this invention, both supporting surfaces are affixed to a common fuselage in planes perpendicular to each other, so as to form a kind of cross. Under such conditions, when one of said wings is in airplane-supporting position, the other owing to this very fact is in non-supporting position, and vice versa. Thus, the improved airplane is adapted to fly at all times with both wings extended, one wing acting to support the airplane, while the other is only subjected to thrust forces directed in its own plane. The drag on that wing which is in non-lifting position is nearly zero, especially in that condition of the craft where the wing in non-lifting position is the wing designed for high speed flight, sometimes termed hereafter the "supersonic wing" for brevity.

The invention accordingly contemplates the provision of a supersonic wing rigidly secured to the fuselage, and remaining fully extended even when the airplane is flying at low speed, and in particular at taking off and landing, so that this supersonic wing can be designed and constructed with the full strength and rigidity that are essential requisites for high speed flight, and may be secured to the fuselage in a simple and reliable manner.

The invention further provides an airplane of the kind described in which the landing gear projects a sufficient distance to allow the craft to take off and land with its supersonic wing fully extended; owing to the comparatively very small span of such a wing, a landing gear of conventional or near conventional size can be used, and its retraction and expansion may in any case be effected by means of conventional, and long-tested mechanism.

However, the invention further extends in scope to cover a form of embodiment in which the supersonic wing, or at any rate the lower half thereof, is adapted to be jettisoned prior to landing, after the craft has been brought to its low-speed condition for landing. Such an embodiment is especially desirable when it is desired to make a "belly landing," for instance in the case of a seaplane, or further when a special landing installation is used, as on board an aircraft carrier. Releasing one half a supersonic wing structure is a simple operation owing to its small size and the replacement of such a half wing by another is economically feasible.

The invention further provides means for changing the craft from its low-speed flying condition to its high-speed flying condition. Such means comprise an aircraft surface control device whereby flight control may be exerted in either of its flying conditions, and, moreover, means for providing the pilot, and crew if any, with convenient accommodation in both flying attitudes of the craft.

It is, in this connection, an additional object of the invention to provide an airplane of the type described which can be flown by a pilot using the same controls, and exerting similar control motions, in either one of two conditions of the aircraft.

It is a further additional object of the invention to provide such an airplane in which the transmission system between the pilot controls and the control surfaces of the craft are simplified.

Another additional object is the provision of such a craft wherein the said transmission system comprises elements that are operative both in the flying condition corresponding to low speed flight and in that corresponding to high speed flight.

Another object is to provide an airplane in which a flight control system will automatically adapt itself as the craft shifts from either one to the other of its flying conditions.

A further object is to provide an airplane of the kind described which will provide the pilot with similar flying accommodations in both conditions of the fuselage corresponding to the respective ranges of flying speeds.

One form of embodiment of the invention will now be described by way of illustration and not of limitation, with reference to the accompanying drawings wherein:

Fig. 1 is a lateral view of an aircraft according to the invention taxiing on the ground;

Fig. 2 is a front view of the same;

Fig. 3 is a lateral elevation view of the aircraft in the subsonic condition;

Fig. 4 is a front view corresponding to Fig. 3;

Fig. 5 is a plan view corresponding to Fig. 3;

Fig. 6 is a lateral elevation view of the aircraft in a transitory condition;

Fig. 7 is a front view corresponding to Fig. 6;

Fig. 8 is a lateral elevation view in the supersonic condition;

Fig. 9 is a front view corresponding to Fig. 8;

Fig. 10 is a view in elevation showing the main frame elements of the subsonic wing respectively for the extended position, the intermediary position and the folded position;

Figs. 13a and 13b are perspective views showing the system of controls for the subsonic condition of the aircraft;

Figure 11:
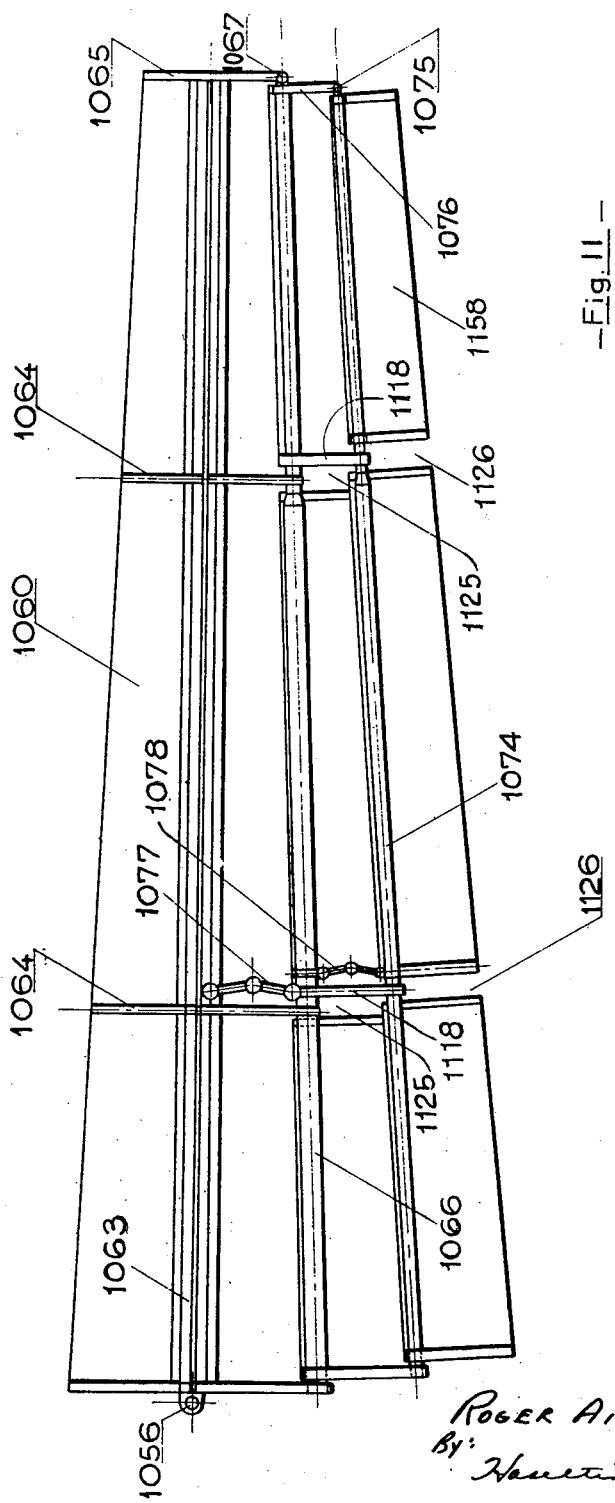
Fig. 11 is a general schematic view of the framework of the subsonic wing.

As shown in the drawing, an aircraft according to this invention may comprise a fuselage 1 containing within it propulsion means supplying an exhaust jet escaping through a rear jet outlet 2. In the exemplary construction shown, the propulsive unit comprises a ramjet unit having an external casing or nozzle 3 defining one or more air inlets as shown at 4 and 5 with the fuselage 1. The propulsion plant further comprises a turbo-jet unit 6 provided for use at lower flying speeds, and exhausting into the central portion of the rear outlet of the craft. The nozzle 3 which forms part of the ramjet supports a tail-fin structure including four fins 8, 9, 10 and 11 spaced 90° from one another, and each provided with a control surface or flap 8a, 9a, 10a and 11a respectively. The arrangement just described is similar to that shown and described in my U. S. application Ser. No. 768,625, filed August 14, 1947.

As shown the airplane is provided with two wings set in planes 90° apart on the fuselage. One wing 12 is designed with the configuration suitable for high flying speeds while the other 13 has the configuration suitable for lower speeds and especially for taking off and landing. The wings extend substantially in diametric planes of the fuselage 1 which bisect the angles defined by the fins 8–11 of the tail-fin structure; in other words, the tail-fins lie on planes at 45° from the planes of both wing structures.

The high-speed or supersonic wing 12 is small in span and its leading edges 14 and 15 define an angle substantially differing from 90° relative to the fore-and-aft axis X—X of the craft, and are formed with a thin, or laminar, aerofoil contour. The other wing 13, designed for the lower speeds, and especially for taking off and landing, or the subsonic wing for short, is much greater in span than the supersonic wing, and its leading edges 18 and 19 are perpendicular or substantially perpendicular to said fore and aft axis.

For each wing, the mean center of thrust is suitably placed with respect to center of gravity of the aircraft in the respective condition, subsonic or supersonic.

The airplane is provided with a landing gear consisting a front leg 22 located in the longitudinal centre plane of the airplane, which contains the supersonic wing 12, and two side legs 23 and 24 on each side of said wing, the three legs being retractible and projectable in flight and being house, when retracted, within the fuselage, as shown in broken lines in Fig. 8. The landing gear forms no part of the present invention, and need not be described in further detail. It may be indicated however, that the length of the legs 22, 23 and 24 is so selected that when extended, the aircraft can roll on the ground, with the supersonic wing tip spaced a sufficient distance above the ground, as clearly shown in Fig. 7.

The pilot is accommodated in a cabin 25 inside the fuselage, mounted for rotation about the fore and aft axis through means to be further described hereafter.

The supersonic wing parts 14, 15 are secured to the fuselage 1 in conventional manner, and the securing means are not described in detail herein.

The subsonic wing 13 is mounted so as to be foldable along the fuselage 1, this latter being provided, forwardly of the wing 13, and substantially in the same diametric plane as it, with fairshaped housings 20 and 21.

As described in my U. S. application Ser. No. 3,437 filed January 21, 1948, this foldable wing (more precisely each half-wing) (Fig. 10) comprises three (or another number of) longitudinal elements 1060, 1061 and 1062. The element 1060, which comprises the leading edge, is the frame or resisting element. It comprises essentially a spar 1063, which extends on all the length of the wing and on which is mounted the attachment 1056 to the fuselage. Ribs such as 1064 transmit to the spar the stresses received by the elements that these ribs support. On an end-rib 1065 of the element 1060 is mounted the element 1061. The framework of this latter is constituted by a tubular member 1066 rotatively mounted about an axis 1067 substantially parallel to the axis 1056.

The rear element 1062 comprises likewise a tubular frame member 1074 which is mounted on the element 1061 in the same manner as this latter is mounted on the element 1060, by rotation assembling about an axis 1075 on the end-rib 1076 of the element 1061.

The elements 1060, 1061 and 1062 are further connected between them by one or several compass-systems. Such a system is shown on Fig. 10; it comprises two V-linkages, one of which, 1077, is interposed between the spar 1063 and the tube 1066 and the other of which, 1078, between the tube 1066 and the tube 1074. These V-linkages insure in their extended position the resistance to the torsion stresses applied on the tubes 1066 and 1074.

Through these V-linkages likewise, one controls the insertion of the longitudinal elements 1060, 1061 and 1062, the one within the other in view of minimizing the depth of the wing in folded position. This contraction of the wing may be realized either before the folding or during the folding. It can be realized either by independant power means or as a consequence of the general folding movement of the wing.

In the embodiment shown, the branch 1079 of the linkage 1077 pivotally mounted as at 1080 on the spar 1063 (slotted to give it passage) is extended by an arm 1081. At the end 1082 of this arm is pivotally mounted the end of a pulling rod 1083, the other end of which is pivotally mounted as at 1084 on the fuselage 1051 of the airplane.

The axes 1056 and 1084 are located in such a way that when the wing 1054 rotates about the axis 1056 for the folding, the pulling rod 1083 exerts a pull on the arm 1081 provoking thus the closure of the V-linkage 1077 and consequently the insertion of the element 1071 within the element 1060.

A cinematic connection is provided between the linkage 1077 and the linkage 1078. This connection is such that the closure or opening of one provokes the closure or the opening of the other.

As shown Fig. 10, the telescoping of the elements 1061 and 1062 within the element 1060 is terminated as soon as the wing 1054 passes from the extension position I to an intermediary position II. As the folding movement continues, the pulling rod 1083 extends and the telescoping of the elements the ones within the others subsists.

To that effect, the pulling rod 1083 is formed by two elements 1090 and 1091 capable of sliding one within the other. A strength spring 1092 interposed between a washer 1093 terminates the rod 1090 and a stop 1094 at the end of the tube 1091 prevents the extension of the connecting rod 1083. The power of this spring is chosen in such a way that during the first phase of the folding movement, it prevents the extension of the connecting rod 1083, permitting thus to this latter to control the telescoping of the elements 1061 and 1062 in the element 1060. During the second phase of the movement, i. e. for the passage of the wing 1054 from the position II to the position III, the spring 1083 is compressed, allowing thus the extension of the pulling rod 1083.

The folding movement in the shown embodiment is controlled by a telescopic system. This system comprises two telescopic screws 1095 and 1096, which are symmetrically arranged with respect to the median plan 1097 of the spar and hinged to this latter by a pivot 1098. These screws 1095 and 1096 are driven by a shaft 1099 through pairs of conical pinions 1100 and 1101. On the shaft 1099 is mounted an helicoidal wheel 1102, meshing with a tangential screw 1103 (Fig. 10) rotated by power means not shown.

So as to minimize the space within the fuselage, the distance between the telescopic screws 1095 and 1096 is relatively small, and may even be, inferior to the thickness of the elements of the wing that it is adapted to embrace.

According to a further feature the elements 1061 and 1062 are used as flaps, for instance as landing flaps.

According to the invention, the pilot is accommodated in a cabin or cockpit formed as a body of revolution about the fore and aft axis of the airplane, as generally speaking is the fuselage itself. The cabin is mounted for rotation about said axis relative to the remainder of the fuselage structure so that the cabin can retain a fixed position in space, or be restored to such position, as the airplane is changed from its one to its other flying attitude or condition, by a 90° rotation of the wing-supporting portion of the fuselage. In other words, the pilot and crew if any, can retain a normal position with respect to the force of gravity, whether the airplane is in its high-speed or in its low-speed flying attitude.

Figure 12:
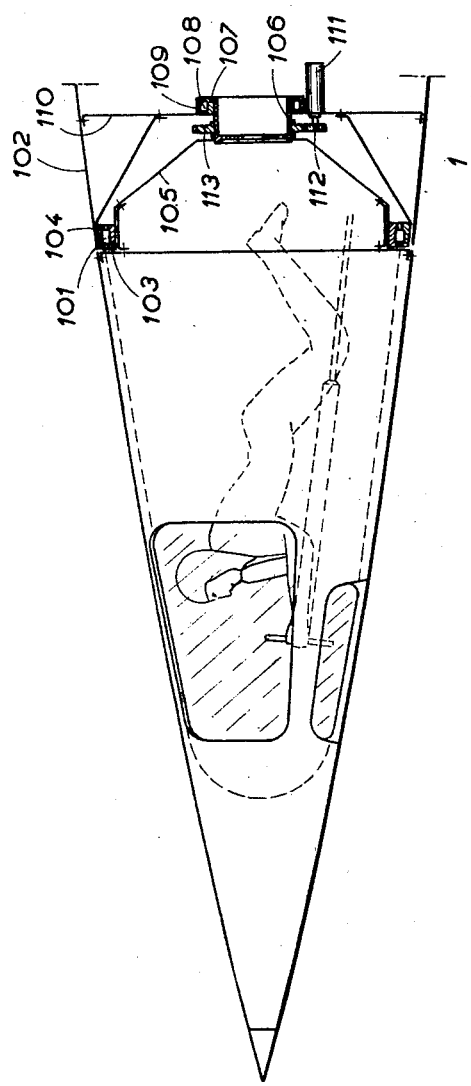
Fig. 12 is a view of the front part of the aircraft in lateral elevation, partially sectioned.

Fig. 12 shows one form of embodiment of the front portion of such an airplane. The cabin 100, in which the pilot is accommodated, is mounted for rotation relatively to the remainder of the fuselage about the common axis thereof by means of ball or roller bearings 101 interposed between the cabin 100 and the fuselage structure 102 proper. The cabin 100 is connected with the inner race 103 of said bearing while the fuselage structure proper is rigid with the outer race 104. The rear wall of the cockpit 100 is defined by a wall 105 having a tunnel or bushing 106 integrally connected therewith, the tunnel 106 in turn being integral with the inner race 107 of a further roller bearing 108, the outer race 109 of which is secured to a transverse partition 110 forming part of the fuselage structure proper. Extending through and rigidly supported in the wall 110 is a motor 111, e. g. an electric motor, having an output or drive gear 112 meshing with an annular gear 113 secured on the bushing 106. Means are provided at the pilot's disposal for operating the motor 111.

The invention further contemplates a flight control system of a character such that the pilot in the cabin or cockpit is able to fly the craft in either its high-speed or its low-speed flying attitude with the use or exertion of control motions that are similar in both cases, and are governed by similar natural reflexes. In other words, the pilot, on shifting the flight attitude of his craft from one to the other of its two conditions, need to give no further thought to the matter and merely proceeds to fly the craft in the same way as before despite the change in flying conditions. In this way, flying the improved airplane of the invention is as simple as flying an unconvertible plane.

One embodiment of such flight control system will now be described. The improved flight control system comprises a warping control handwheel 120 (Fig. 13a) secured on a shaft 121 mounted for rotation in a tubular bushing 122, while being connected thereto for axial sliding displacement therewith as by circumferential keyways, for purposes to be later described. The tubular bushing 122 is mounted for rotation in bearings 123 and 124. Secured on the shaft or shank 121 is an arm 125 having pivoted to the end thereof a rod or link 126 connected at its other end with a bell crank lever 127 rockably mounted on a pivot 128 and including two arms 129 and 130. Pivotally mounted on the arm 130 is a link 131 engaging the end of a finger 132 secured on a rod 133 mounted for rotation about its axis and provided at its other end with a finger 135 pivoted on a pivot 136 and a further rod 137 extending through the transverse partition wall 110 in a tubular slide 138. Pivoted on the end 139 of rod 137 within the fuselage structure proper is a link 140 which engages one arm of a bell crank lever 141 the other end of which is pivoted to a link 142 adapted through a further bell-crank lever 144 pivoted on a pin 145, to actuate a longitudinally extending link 143. Link 143 is extended by a link 146 (Fig. 13b) and an oscillable crank 147 supporting both links at the junction thereof is mounted for movement about a pin 148. The link 147 is pivoted at its rear end on the end 149 of a bell-crank lever 150 having two arms 151, 152. Lever 150 serves to operate a warp-control ring 153 for the tail-fins 8—11. Warm-control ring 153 is arranged with its axis coincident with the main fore-and-aft axis of the craft and is mounted for rotation about said common axis as by means of rollers 154—157. About the ring periphery are pivots 158, 160, 161; which, with the attachment of lever 150 to said ring, are angularly spaced 90° from one another, and attached on each of the pivots is an arm 162, 164, 165. Each of these arms, as for instance the arm 162, is secured on a rod 166 having secured to the other end thereof an arm 167, the opposite end of which carries a finger 168 secured to the respectively related tail-fin, i. e. tail-fin 8. Each tail-fin such as 8 instead of being fixedly mounted on the fuselage, is mounted thereon for rotation about a pivot 169 set in the fuselage structure proper in the rearward portion thereof which consists of the ramjet nozzle in the form of embodiment shown, and is directed radially i. e. in a direction intersecting the fore-and-aft axis of the aircraft. The pivot 169 is arranged substantially in the medial area of the tail-fin 8, so that the said tail-fin has, with reference to the pivot, a front portion and a rear portion having substantially equal surface areas. The finger 168 is connected with the forward portion of the tail-fin 8 at an attachment point 170 spaced a substantial distance from the pivot 169. A similar connection is interposed between the annulus 153 and each of the other three tail-fins, the tail-fins 8 having a slot cooperating with said finger, as the axes of rotation of the tail-fins and of the finger are different. Thus, visible on the drawing is an arm 164 pivoted on the control ring 153 at a point diametrically opposite the pivot 158, and secured on a rod 172, the other end of which has secured thereon a further arm or crank 173 which actuates the tail-fin 10 through a finger 174.

Tail-fin 9 however, rather than being operated through the ring 153, is operated directly from the actuating bell-crank lever 150 having its axis extended by the rod 175, which at its end 176 carries a crank 177, the end of which is in the form of a finger 178 projecting into the front portion of fin 9. Tail-fin 11 on the other hand is arranged for actuation in a manner similar to that described for tail-fins 8 and 10, that is, through a crank or arm 165 pivoted at 161 on the operating ring 153.

The rod 121 is furthermore mounted for axial sliding movement relative to bearings 123 and 124 as shown; alternatively, the rod 121 may be mounted for axial movement relative to tubular bushing 122, which in such case would be mounted fixed in axial position with respect to said bearings. Pivoted on the rear end of rod 121 is a bell-crank lever 190 connected at its end 191 remote from the end 192 with a rod 193. Rod 193 is pivoted to the end 194 of an arm 195 of a beam 196, the other arm 197 of which has pivoted to the end 198 thereof a pair of links 199 and 200 arranged in a transverse plane of the aircraft at 90° from each other. Pivoted to the end 194 is a further link 201 extending in the same transverse plane as, and 90° with respect to, link 193. Beam 196 includes central portion 202 formed as a ball cooperating with a complementary spherical socket 203 formed in a plate 204 that forms part of the wall 110. Connected rigidly with this plate 204 is the previously mentioned tubular slide or tunnel 138 which slidingly cooperates with the rod 137.

Link 199 is connected at its end 217 opposed from the end 198, with an angle-transmission 218 pivoted on a pivot 219 and adapted to transmit movement to a longitudinally extending link 220 extended by a further longitudinally directed rearmost link 221, the junction 222 between both links being supported by a crank 223 pivoted about a pin 224. Link 221 at its rearmost end is pivoted by means of a pivot 225 to the top 226 of a casing 227 which is mounted for rotation by means of side appendages 229 and 230 thereof on a support extending transversely of a fore-and-aft axis of the craft, as by lugs 231 and 232 projecting from a body 233 integral with the fuselage. Housed in the casing 227 is a vertical shaft 234 having secured thereon a pair of gear sectors 235 and 236 in diametrically opposed relation. Said sectors mesh with angular sector gears 237 and 238 respectively secured on output shafts 239 and 240 which have secured to their ends cranks 241 and 242 which are connected engage with the links 243 and 244 adapted through crankpins 245 and 246 to rotate bars 247 and 248. Bar 248 is provided at its ends with oppositely directed cranks 249 and 250, as clearly shown in the drawing, crank 249 being pivoted to a link 251 which engages a crank 252 secured on a rod 253, the foremost end of which engages through a pin 254 the front portion 255 of flap 8a pivoted on the rear of tail-fin 8 and forming a part thereof. Crank 250 similarly operates a link 256 which, through a crank 257 secured on a rod 258, actuates at its foremost end 259 the rear flap 10a of the tail-fin 10 diametrically oppositely related to tail-fin 8. Bar 247 is provided at its ends with a pair of cranks 260 and 261 extending parallel to each other and both in the same direction, connected for actuating links 262 and 263 respectively which, in a manner similar to that just described, are arranged respectively to control the setting of flap 11a through crank 264 and rod 265, and the setting of flap 9a through crank 266 and rod 267, respectively.

Further provided for operation by the pilot are a pair of pedals 268 and 269 respectively forming the end of two levers 270 and 271 mounted for rotation on a transverse shaft 272. Lever 270 is extended by a gear sector 273 and lever 271 is extended by a gear sector 274. Both sectors 273 and 274 mesh with a common gear wheel 275. Sector 273 is integral with a bushing 276 rotatably surrounding the shaft 272 and said bushing having secured thereon a crank 277 which, through a link 278, actuates a bell-crank lever 279 rotatably mounted on a pin 280 and having its end 281 connected with the link 201.

Link 200 arranged with the fuselage structure proper furthermore actuates a crank 282 secured on a rod 283 which at its other end is provided with a further crank 284 actuating a longitudinal link 285 extended by a rearward longitudinally extending link 286, the junction 287 between both links being supported by a crank 288 mounted for rotation on a pin 289. The rear end of link 286 engages an angle transmission 290 rotatable on a pin 291 and adapted to transmit movement to a link 292 connected at 293 for actuating a crank 294 secured on a vertical shaft 295 formed as an extension of vertical shaft 234 and connected therewith through a universal joint 296.

In the neutral condition of the aircraft flight control system illustrated in the drawing, the axis of beam 196 is coincident with the main fore-and-aft axis of the craft, about which axis the relative rotation between cockpit and fuselage structure proper is effected. Moreover, the point of attachment of the end 297 of the link 140 to the angle transmission 141 is located on said fore and aft axis.

The system operates in the following way:

Preparatory to taking off, the aircraft is in the attitude shown in Fig. 1, its landing gear 22, 23, 24 being projected and resting on the ground, its subsonic wing being extended in horizontal or supporting position, and its supersonic wing 12 fixedly secured on the fuselage extending in a vertical plane as clearly shown in Fig. 2. Under such conditions the aircraft takes off in the usual way, using turbo-jet propulsion. After having taken off the aircraft retracts the landing gear and progressively gathers speed. It then is in the condition shown in Figs. 3 to 5. When a certain predetermined speed has been attained the ramjet unit is put into action so as to combine its thrust with that of the turbo-jet unit. However, it is to be understood that the propulsion means used on an aircraft according to the invention may be different from those described, and form no part of this invention. After having reached a predetermined speed, the pilot may convert the aircraft from its subsonic flight attitude to its supersonic flight attitude. For this purpose any of a number of types of attitude-control maneuvers can be employed, all of which however essentially consist of rotating or rolling the craft 90° about its fore-and-aft axis so as to bring the subsonic wing to non-supporting position and at the same time the supersonic wing to its supporting position, the subsonic wing thereafter being retracted, and the cabin being maintained in or brought back to a position in which the pilot retains his natural position with respect to the force of gravity.

For example, the pilot in order to pass from the subsonic attitude to the supersonic attitude may exert rolling control as described in detail hereinafter, so as to impart to the craft a bodily 90° rotation or half-roll to left or right, thus bringing the subsonic wing from its supporting to its non-supporting position. The aircraft is now in an intermediate or transitory condition as shown in Figs. 6 and 7. During this part of the maneuver, the cabin participates in the rolling movement of the fuselage and the airplane is so to speak bodily placed edgewise. The subsonic wing is then retracted in the manner more particularly described above. On completion of this operation, the supersonic wing is in supporting position and the subsonic wing retracted; however, the pilot's cabin has retained its initial position with respect to the remaining fuselage structure, so that the pilot is lying on his side. To restore the cabin to a position corresponding to usual flight conditions, the pilot operates electric motor 111. This imparts a rotation to cabin 100 about the aircraft fore-and-aft axis, until the pilot has returned to his natural position perpendicular to that which prevailed before motor 111 was started. During this phase, the fuselage structure proper does not tend to revolve about the fore-and-aft axis of the craft owing to the stabilizing action of the supersonic wing 12, while the cabin 100 of course is deprived of any stabilizing or supporting surface so that it can be readily so revolved. The aircraft is then in its supersonic condition shown in Figs. 8 and 9.

For landing, operations are reversed. When flying in supersonic attitude, the pilot after having first if necessary reduced speed, though still maintaining a speed consistent with proper support with the supersonic wing, expands the subsonic wing, which then assumes its non-supporting position shown in Fig. 7. The pilot then imparts to the aircraft a half-roll about the fore and aft axis, by a manoeuvre similar to that mentioned previously, but in opposite direction, thus bringing the subsonic wing to supporting position, and at the same time the supersonic wing is brought to its non-supporting position. The pilot then imparts to the cabin a 90° rotation reverse from that imparted to the airplane so as to restore perpendicularity by operating motor 111. The airplane has then completely assumed its low-speed flying attitude and condition, and may be landed as easily as an ordinary plane constructed for moderate or low flying speeds.

Figure 13A:
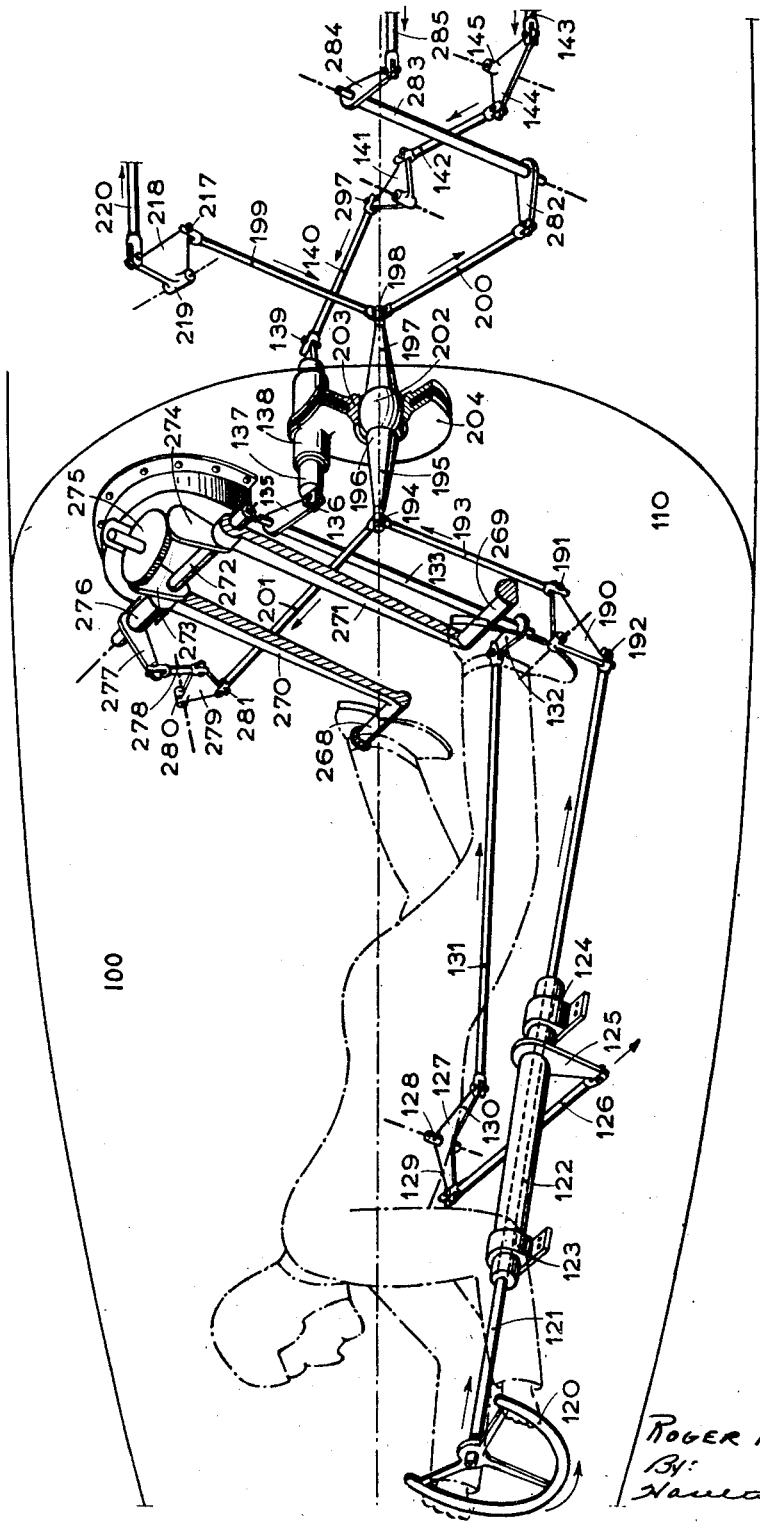

Further details of the flight control system working will now be disclosed. Reference is made to Figs. 13a and 13b illustrating the low-speed flight condition. When the pilot desires to exert warp or roll control, he will impart to the handwheel 120 a rotation about the axis of rod 121, for instance in the direction indicated by the arrow. Rotation of rod 121 causes an axial displacement of link 126 in the direction indicated by an arrow, this in turn acting through angle transmission 127 to displace link 131 as indicated by an arrow. This displacement is transmitted through crankpin 132 and converted into a rotation of rod 133. Rotation of rod 133 causes a sliding displacement of rod 137 within tubular bushing 138, this displacement under the assumed conditions causing the rod to project further towards the cabin. This results in a displacement of link 140 in the direction indicated by an arrow, then, through angle transmission 141, link 142 is displaced producing a corresponding displacement of links 143 and 146 in the direction indicated, i. e. forwards. Bellcrank lever 151 is rotated clockwise as shown in Fig. 13b, thereby rotating ring 153 in the direction indicated by an arrow. Said ring rotates the arms or cranks 162 and 164 and also rods 166 and 172 on which they are secured, in the direction indicated, and the tail-fins 8 and 10 are bodily rotated about their pivot 169 and 301 respectively, in the direction indicated by the arrows, that is, their rear edges, 310 and 311 respectively, move towards the longitudinal vertical plane of the craft. Rotation of bell-crank lever 151 moreover will have caused fin 9 to be rotated through rod 175 and crank 177 and rotation of fin 11 is produced by movement of ring 153 through crank 179. As a result of these rotations of fins 8—11, the left low-speed wing rises. If handwheel 120 is rotated in the opposite direction, the left low-speed wing is lowered.

When the pilot wishes to climb or dive, the handwheel 120 is pulled or pushed, thereby moving rod 121 in or out of tubular bushing 122. Assume for example that the pilot pushes the rod 121 inwards. This through angle transmission 190 results in an upward displacement of link 193, which is transmitted through beam 196 to impart a downward movement to link 199 arranged on the fuselage structure proper, and this downward movement of link 199 is converted into a rearward displacement by angle transmission 218 of the links 220 and 221. It is to be noted that the downward movement of the end 197 of the beam produces an operative movement of link 199 only, while link 200, though also connected at the end of arm 197, assumes a movement which is not transmitted by the crank 282 to which its other end is connected.

The link 221 rotates the casing 226 about the axis of the bearings 231 and 232 which support this latter on the body 228, and the links 243 and 244 are displaced forwards through the cranks 241 and 242. The link 243 rotates thus through the crank 245 the bar 247, and the links 262 and 263 move in the same direction forwards, as shown by the arrows. The link 244 rotates through the crank 246 the bar 248, and the links 251 and 256 are moved in opposite directions, as shown. Flaps 8a, 9a, 10a and 11a are thereby rotated in the directions indicated by double head arrows, and the airplane is set into a climb. A reverse operation, that is pulling rod 121 out of bushing 122, will similarly bring the flaps to the positions for which the plane will dive.

For directional control, the pilot will depress either of the pedals 268 and 269. If for instance pedal 268 is depressed, the reversing device including the gear sectors 273 and 274 interconnected by gear 275, causes the other pedal 269 to be moved in the opposite direction. Link 201 is moved in the direction shown by the arrow owing to the transmission provided by link 278 and angle transmission 279. This movement of link 201 causes beam 196 to pivot in a horizontal plane. The beam thus transmits a movement in the direction indicated by the arrow to link 200. For the reason previously given, links 193 and 199 do not then assume an operative displacement. Movement of link 200 is transmitted through cranks 282 and 284 secured on common rod 283 to links 285 and 286. This movement is transmitted through link 292 and crankpin 294 to the vertical shaft 295 which assumes a clockwise rotation, as viewed from the shaft's upper end. Gear sectors 235 and 236 acting through angle sectors 237 and 238, thus impart reverse rotations to shafts 239 and 240 in the directions indicated by arrows producing a corresponding forward movement of link 243 and rearward movement of link 244. Bar 247 then rotates in the direction indicated by an arrow while bar 248 revolves in the opposite direction. Links 262 and 263 assume a forward movement, while link 251 assumes a forward, and link 256 a rearward movement. Flaps 8a—11a assume the positions for which the aircraft initiates a rightward turn.

A reverse operation, i. e. depression of pedal 269, will cause flaps 8a—11a to assume the positions for which the airplane turns left. It will be understood that the rolling, diving or climbing and turning control operations as separately described hereinabove, may be combined with one another to impart to the plane any desired flying attitude or change of heading.

Figure 14A:
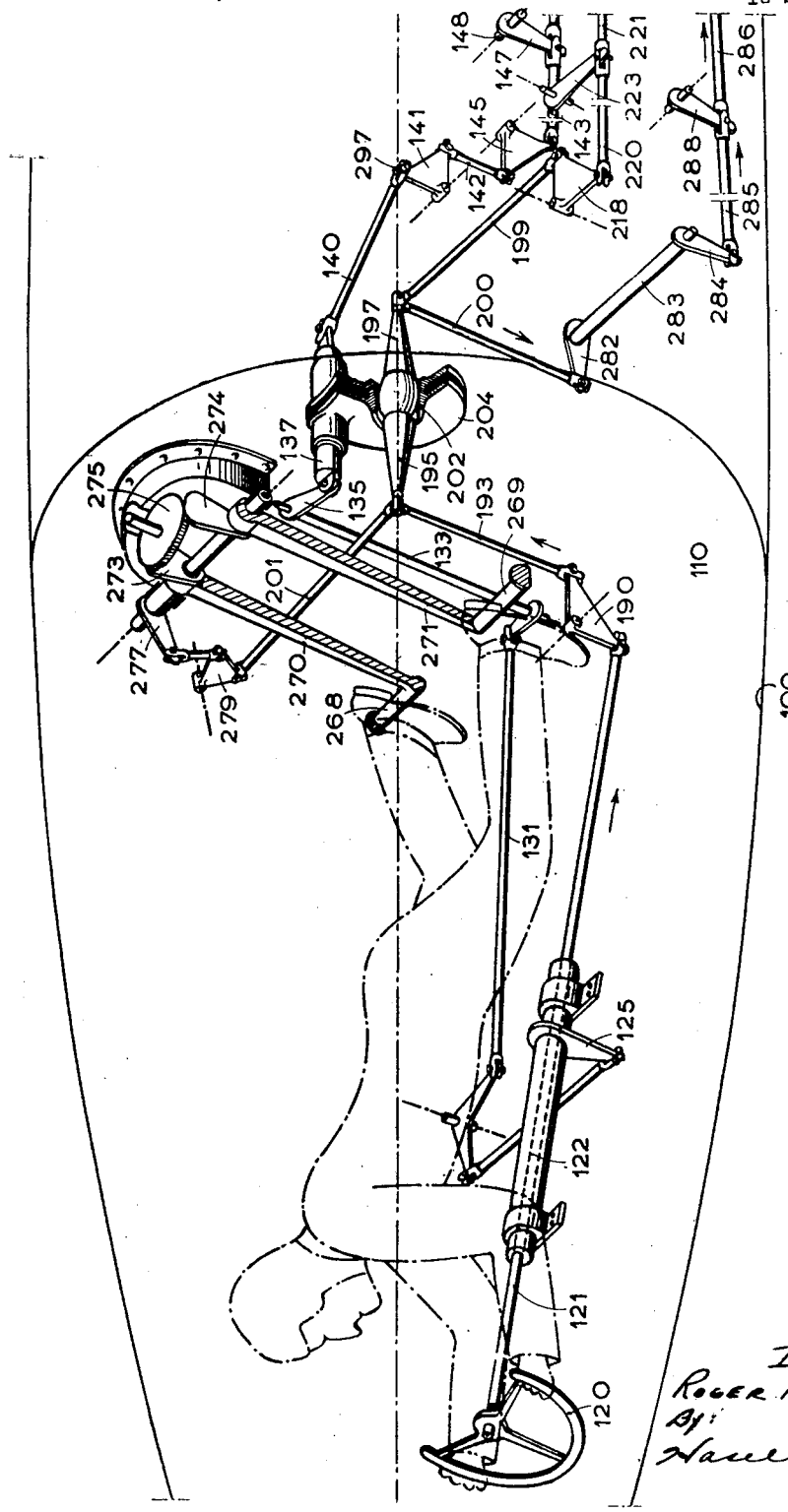
Figs. 14a and 14b are general perspective views similar to Figs. 13a and 13b, but for the supersonic condition of the aircraft.
Figure 14B:
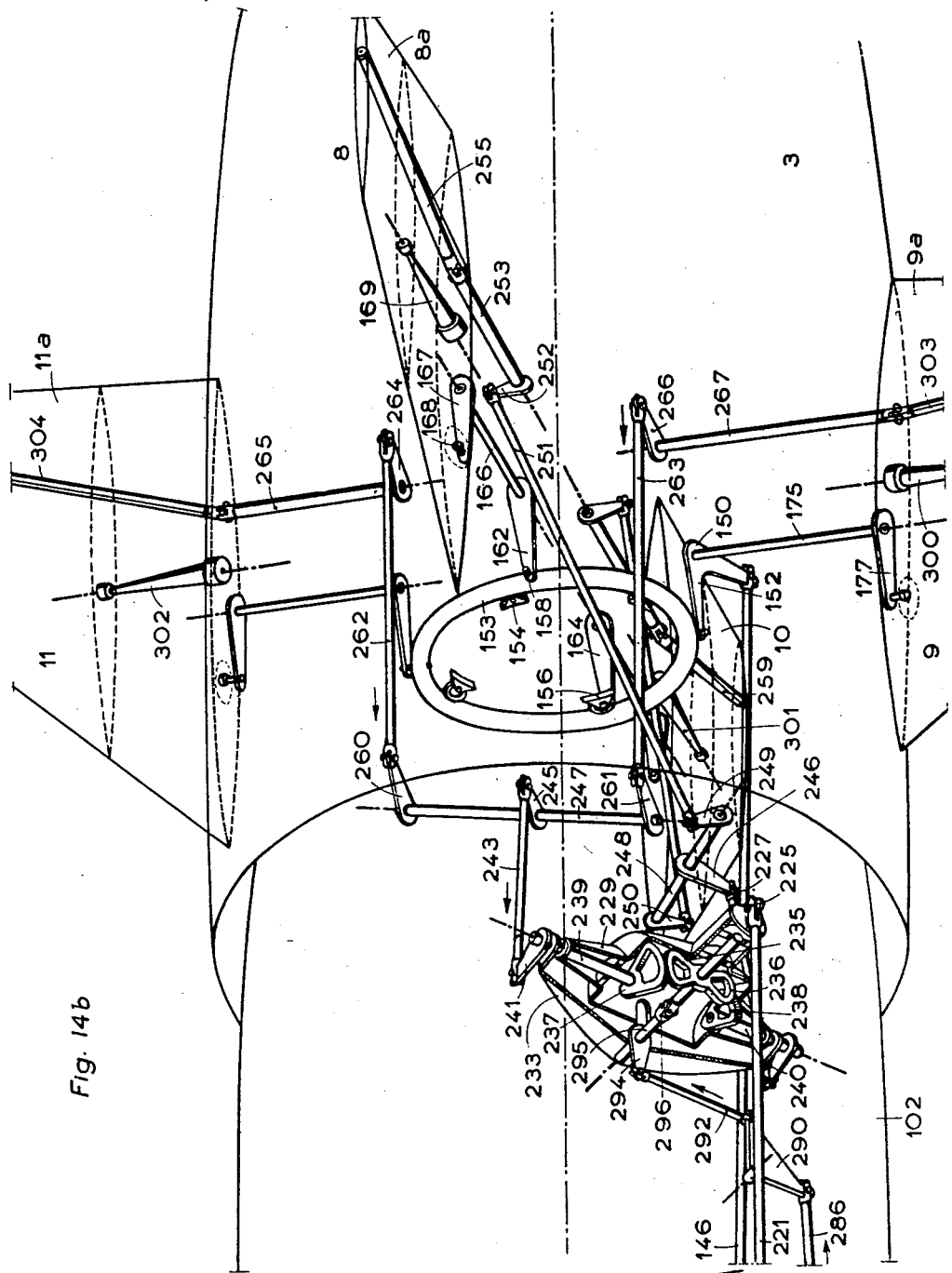

Figs. 14a and 14b show the controls of the aircraft for the supersonic condition. From the subsonic condition, shown on Fig. 24, the cockpit 100 and the fuselage proper 102 have rotated from 90° about their common axis, as above explained. Looking behind the aircraft, this latter has rolled from the supersonic condition, in a bodily move 90° in an anti-clockwise direction, the pilot lying then with his left side towards the ground, after which the cockpit has been rotated 90° in the clockwise direction.

Rolling control being perfectly symmetric about the fore-and-aft axis, a relative rotation of the cockpit and the remainder of the fuselage has no influence on the working of this control. In rotating the hand-wheel 120, the pilot exerts in supersonic condition the same action on the link 143 and the members actuated through this latter including the tail-fins 8—11, that for the subsonic condition, the connection between the lever 141 and the link 140 being exactly on the fore-and-aft rotation axis.

The control for a dive or a nose-up manoeuvre, in pushing or pulling the rod 121, causing a rocking of the beam 196 in a vertical plane does not actuate the transmission originating at the link 199, as in subsonic condition, but actuates the connection originating at the link 200, which in supersonic condition is now in this vertical plane. A movement of the link 200 caused in subsonic condition a lateral action (right turn or left turn); now as a result of the rotation of the fuselage including the tail-fins 8–11, ending in the supersonic condition, a movement of the link 200 results in a vertical action, i. e. the pilot controls a dive or a climbing up. This is checked easily on Figs. 14a and 14b. On this figure, arrows have been shown for this control. By pushing on the rod 121, the flaps 8a—11a are pointed in positions for which the aircraft noses up. In supersonic condition a dive or a climbing up is thus controlled by the pilot exactly by the same actuation as in subsonic condition.

Depressing one of the pedals 268 or 269 results in a turn either rightwards or leftwards. In Figs. 14a and 14b, arrows show for the transmission including the link 119 the displacement for a right turn.

What I claim is:

1. In an aircraft having a fuselage member, two supporting wings on said fuselage member disposed substantially in the form of a cross having different wing areas defining different wing loadings and adapted respectively to support the aircraft at high speeds and at relatively low speeds, and the branches of the cross intersecting along the longitudinal axis of the aircraft, the fuselage member being mounted for rotation about said axis relatively to the remainder of the aircraft, and means for rotating said fuselage member about said axis thereby selectively to bring a desired one of said wings to an aircraft-supporting position.

2. In an aircraft having a fuselage member, a first wing having a relatively large wing area to support the aircraft for low-speed flight and a second wing having a relatively small wing area to support the aircraft for high-speed flight, said wings being fixed to said fuselage member and forming the branches of a cross, means for rotating said fuselage member and cross, relatively to the remainder of the aircraft, about the intersection of the branches thereof to bring said first wing to an aircraft-supporting position in low-speed flight, said second wing then assuming a non-supporting position, and to bring said second wing to an aircraft supporting position in high-speed flight, said first wing then assuming a non-supporting position.

3. In an aircraft having a fuselage member, a retractable wing adapted to support the aircraft for low-speed flight and a wing adapted to support the aircraft for high-speed flight, said wings being supported on said fuselage member and forming the branches of a cross, and said wings having different wing areas defining different wing loadings suitable to support the aircraft in the respective speed ranges, means for rotating said fuselage member and cross, relatively to the remainder of the aircraft, about the intersection of the branches thereof, so as to shift one of said wings from an aircraft-supporting position thereof to a non-supporting position thereof, while the other wing shifts from a non-supporting position thereof to an aircraft-supporting position thereof, and means for retracting said low-speed wing when said high-speed wing assumes the aircraft-supporting position thereof.

4. In an aircraft having a fuselage member, a retractable wing adapted to support the aircraft for low-speed flight and a wing adapted to support the aircraft for high-speed flight, said wings being supported on said fuselage member and forming the branches of a cross, means for rotating said fuselage member and cross, relatively to the remainder of the aircraft, around the intersection of the branches thereof so as to shift a desired one of said wings from a supporting to a non-supporting position while the other wing is shifted from a non-supporting to a supporting position, and means retracting said low-speed wing when said low-speed wing assumes the non-supporting position thereof.

5. An aircraft which comprises a fuselage in two sections including a first front-section with housing accommodations therein and a second section extending rearwardly from said first section, a wing adapted to support the aircraft for low-speed flight on said second fuselage section and a second wing adapted to support the aircraft for high-speed flight on said second section extending at right angles to said first-wing, and means for rotating one of said fuselage sections with respect to the other fuselage section around the longitudinal axis of the fuselage.

6. An aircraft which comprises a fuselage, a cabin at the front of the fuselage, means for so mounting said cabin within said fuselage as to permit the relative rotation thereof about the longitudinal axis of said fuselage, a wing adapted to support the aircraft for low-speed flight carried on said fuselage and a wing adapted to support the aircraft for high-speed flight carried on said fuselage extending at right angles to said first wing and forming a four-branch cross therewith, rolling control means for bodily rotating the aircraft in flight about a longitudinal axis and means for rotating the cabin relatively to said fuselage about their longitudinal common axis.

7. An aircraft comprising a fuselage, a cabin at the front of the fuselage, means for rotatively supporting the cabin by the fuselage, the rotation occurring about their common longitudinal axis, means for imparting to the cabin a rotative movement relatively to the fuselage, a first wing carried by the fuselage and adapted to support the aircraft at high speeds, a second wing carried by the fuselage forming a cross with the first wing and adapted to support the aircraft at relatively low speeds, an empennage carried by the fuselage comprising four tail-fins disposed cross-wise in longitudinal planes bisecting the angles between the planes of said wings, means for supporting each of said tail-fins on the fuselage rotatively about an axis intersecting the longitudinal axis, means for deflecting the tail-fins about their supporting axes, a flap rotatively mounted on each of the tail-fins and means for controlling the deflection of the flaps.

8. In an aircraft: a fuselage, a supporting surface carried by the fuselage, controlling surfaces carried by the fuselage, a cabin rotatively mounted on the fuselage about the longitudinal fore-and-aft axis of the aircraft, and a piloting system for the aircraft comprising actuating members inside the cabin, and transmission means between said actuating members and said control surfaces comprising a connection rockingly mounted on a point remaining stationary during the rotation of the cabin relatively to the fuselage.

References Cited in the file of this patent

FOREIGN PATENTS

| | | |
|---|---|---|
| 145,770 | Great Britain | July 2, 1920 |
| 289,771 | Germany | Oct. 15, 1913 |